United States Patent
Fleissner

(10) Patent No.: US 11,747,224 B1
(45) Date of Patent: Sep. 5, 2023

(54) QUARTER-BRIDGE TEMPERATURE COMPENSATION FOR FORCE/TORQUE SENSOR

(71) Applicant: ATI Industrial Automation, Inc., Apex, NC (US)

(72) Inventor: David Fleissner, Holly Springs, NC (US)

(73) Assignee: ATI Industrial Automation, Inc., Apex, NC (US)

(*) Notice: Subject to any disclaimer, the term of this patent is extended or adjusted under 35 U.S.C. 154(b) by 0 days.

(21) Appl. No.: 17/668,733

(22) Filed: Feb. 10, 2022

(51) Int. Cl.
*G01L 5/00* (2006.01)
*G01L 1/22* (2006.01)
*G01L 5/1627* (2020.01)
*G01L 3/10* (2006.01)
*B25J 13/08* (2006.01)

(52) U.S. Cl.
CPC ........... *G01L 1/2206* (2013.01); *B25J 13/085* (2013.01); *G01L 3/108* (2013.01); *G01L 5/1627* (2020.01)

(58) Field of Classification Search
CPC ..... G01L 1/2206; G01L 5/1627; G01L 3/108; B25J 13/085
See application file for complete search history.

(56) References Cited

U.S. PATENT DOCUMENTS

| | | |
|---|---|---|
| 3,245,252 A | 4/1966 | First et al. |
| 4,172,389 A | 10/1979 | Branch |
| 4,444,056 A * | 4/1984 | Romo ..................... G01L 9/045 73/708 |
| 5,397,968 A * | 3/1995 | Ito ......................... H01J 29/762 315/399 |
| 5,726,564 A * | 3/1998 | Takashima ............ G01P 15/123 323/907 |
| 6,426,495 B1 * | 7/2002 | Hayami ................. H04B 10/69 250/214 R |
| 2007/0115009 A1 * | 5/2007 | Graefling ............... G01R 19/32 324/721 |
| 2013/0300393 A1 * | 11/2013 | Lee .......................... G05F 3/02 323/304 |
| 2016/0155547 A1 * | 6/2016 | Yuan ....................... H01C 7/06 338/9 |
| 2022/0393649 A1 * | 12/2022 | Li ....................... H03F 3/45475 |
| 2023/0055100 A1 * | 2/2023 | Stoerk .................. G01P 15/132 |

FOREIGN PATENT DOCUMENTS

| | | |
|---|---|---|
| EP | 3196619 B1 | 12/2018 |
| WO | 1982003121 A1 | 9/1982 |

* cited by examiner

*Primary Examiner* — Max H Noori
(74) *Attorney, Agent, or Firm* — COATS & BENNETT, PLLC

(57) ABSTRACT

In a Force/Torque sensor employing strain gages, a hardware temperature compensation procedure substantially eliminates thermal drift of a plurality of load-sensing strain gages with changes in temperature, using trimming resistors and a single, unstressed strain gage. The strain gages are connected in a quarter-bridge configuration, in multiple parallel stages. An unstressed strain gage in quarter-bridge configuration is connected in parallel. Trimming resistors are added across one or more of the unstressed and load-sensing strain gages in a compensation procedure that substantially eliminates thermal drift of the load-sensing strain gages over a predefined temperature range.

22 Claims, 10 Drawing Sheets

QUARTER-BRIDGE TEMPERATURE COMPENSATION FOR FORCE/TORQUE SENSOR

FIELD OF INVENTION

The present invention relates generally to robotic force/torque sensors, and in particular to a system and method of temperature compensating a plurality of load-sensing strain gages in Wheatstone quarter-bridge circuit configuration with an unstressed strain gage.

BACKGROUND

Robots are an indispensable part of manufacturing, testing, assembly, and packing of products; assistive and remote surgery; space exploration; operation in hazardous environments; and many other applications. Many robots and robotic applications require quantization of forces applied or experienced, such as material removal (grinding, sanding, and the like), parts assembly, remote digging or other manipulation of the environment, and the like.

An industrial robot typically comprises a generic actuator, or "arm," that is programmed to move through space and operate on a workpiece along numerous degrees of freedom. A variety of different tools, also known as end effectors, may be attached to a robot arm to perform different tasks.

In applications where the degree of force the robot is to apply to a workpiece must be monitored and controlled, and/or the force the robot experiences is fed back to control the robot's motion (a "force control" operation), a force/torque (F/T) sensor is interposed between the robot arm and the tool.

One conventional type of F/T sensor uses strain gages to measure the deformation of small beams connecting two mechanical parts—one coupled (directly or indirectly) to the robot arm and the other coupled (directly or indirectly) to a robotic tool. One compact example of such an F/T sensor is described in U.S. Pat. No. 10,422,707 ("the '707 patent"), assigned to the assignee of the present disclosure, and incorporated herein by reference in its entirety.

FIG. 1, reproduced from the '707 patent, depicts a central "hub," referred to in the art as a Tool Adapter Plate (TAP), which is coupled to a tool. Another body, arranged annularly around, and spaced apart from, the TAP, and referred to in the art as a Mounting Adapter Plate (MAP), is coupled to a robotic arm. The MAP and TAP are connected by a plurality of relatively thin—and hence mechanically deformable—beams, arranged radially around the TAP, and in one configuration resembling spokes of a wheel. Relative force or torque between objects respectively coupled to the TAP and MAP attempt to move the MAP relative to the TAP, resulting in slight deformation, or bending, of at least some of the beams.

Strain gages, typically attached to multiple surfaces of at least some of the beams, detect this deformation. A beam undergoing mechanical deformation will elongate slightly along one side, and compress along the opposite side. Resistive strain gages rigidly mounted to the sides of such a beam experience a corresponding elongation or abridgement, respectively, and the resistance of the strain gage is proportional to its length. Accordingly, the change in resistance of strain gages may be detected and quantified, such as by some configuration of a Wheatstone bridge circuit, and the signals from multiple gages combined to resolve forces and torques acting on the F/T sensor.

The '707 patent describes, and FIG. 1 depicts, strain gages mounted to only one side of deformable beams. This arrangement allows for a very compact sensor body and ease of placement of the strain gages in manufacturing, while still resolving all forces and torques. The strain gages are connected in a quarter-bridge circuit, as depicted in FIG. 2, which is reproduced from FIG. 3 of the '707 patent.

A primary source of error in robotic force/torque sensors is inaccuracy due to thermal drift. Sources of thermal drift include ambient temperature change, ambient temperature gradients, and self-heating. For silicon strain gages, changes in output voltage of the gage circuit due to temperature change can be several times the magnitude of output voltage changes due to induced stresses. In fact, silicon strain gages may be considered to be better temperature sensors than stress sensors. Connecting strain gages in a half-bridge topology can compensate for temperature effects, but only if the gages are well matched, and only if they are placed precisely opposite each other. Furthermore, in addition to affecting strain gage output, temperature changes in a robotic force-torque sensor can induce mechanical stresses due to unequal expansion/compression of structural elements, which the sensor may interpret as an applied load or force.

One approach to compensating for thermal drift is to capture the effects of temperature changes on strain gages, and remove them mathematically. FIG. 3, which is FIG. 8 of the '707 patent, depicts an unstressed, temperature compensation strain gage mounted to a non-stressed mechanical member of the F/T sensor. Because this strain gage experiences no mechanical deformation to alter its resistance, any resistance change is due only to changes in the temperature of the F/T sensor body. The signal from the unstressed strain gage is mathematically removed from signals from load-sensing strain gages, to compensate for thermal effects.

International patent publication WO 2018/200668, assigned to the assignee of the present disclosure and incorporated herein by reference in its entirety, describes subtracting the voltage output by a quarter bridge circuit for an unstressed strain gage from the voltage output by quarter bridge circuits for each load-sensing strain gage. FIG. 4, which is FIG. 2 of the '668 PCT publication, depicts the unstressed strain gage SGU signal being subtracted from the signals of strain gages SG0 and SG1.

However, due to differences in the temperature coefficients of individual strain gages, even when the output of an unstressed strain gage circuit is subtracted, the load-sensing strain gage circuits exhibit variability in output over changes in temperature. That is, at least some of the load-sensing strain gages exhibit different changes in resistance over temperature than does the unstressed strain gage. This is referred to herein as an effective temperature coefficient, relative to the unstressed strain gage. These effective temperature coefficients introduce thermal drift as the temperature changes, and cause errors in the measurement of forces and torques.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a hardware temperature compensation procedure substantially eliminates any effective temperature coefficient of load-sensing strain gages, relative an unstressed strain gage, using trimming resistors. The strain gages are connected in a quarter-bridge configuration, in multiple parallel stages. An unstressed strain gage in quarter-bridge configuration is connected in parallel. Trimming resistors are added across one or more of the unstressed and load-sensing strain gages in a compensation procedure that substantially eliminates any effective temperature coefficient of the load-sensing strain gages, relative to the unstressed strain gage, over a predefined temperature range.

One embodiment relates to a temperature-compensated circuit for a Force/Torque sensor. The circuit includes a first plurality of first stages connected in parallel. Each first stage is configured to output a respective voltage at a node connecting a fixed resistor and a load-sensing strain gage in series between positive and negative power supply voltages. The circuit also includes a second stage connected in parallel with the first stages. The second stage is configured to output a voltage at a node connecting a fixed resistor and an unstressed strain gage in series between positive and negative power supply voltages. The second stage voltage is subtracted from each first stage voltage. The circuit further includes an unstressed trimming resistor connected in parallel across the unstressed strain gage. The value of the unstressed trimming resistor is selected so as to substantially eliminate an effective temperature coefficient, of the polarity opposite that of the power supply connected to the fixed resistors, of all load-sensing strain gages, relative to the unstressed strain gage, over a predetermined temperature range.

Another embodiment relates to a temperature-compensated circuit for a Force/Torque sensor. The circuit includes a first plurality of first stages connected in parallel. Each first stage is configured to output a respective voltage at a node connecting a fixed resistor and a load-sensing strain gage in series between positive and negative power supply voltages. The circuit also includes a second stage connected in parallel with the first stages. The second stage is configured to output a voltage at a node connecting a fixed resistor and an unstressed strain gage in series between positive and negative power supply voltages. The second stage voltage is subtracted from each first stage voltage. The circuit further includes a second plurality of load trimming resistors. Each load trimming resistor is connected in parallel across a load-sensing strain gage. The value of each load trimming resistor is selected so as to substantially eliminate an effective temperature coefficient, of the polarity of the power supply connected to the fixed resistors, of the associated load-sensing strain gage, relative to the unstressed strain gage, over the predetermined temperature range.

Yet another embodiment relates to a method of compensating a plurality of load-sensing strain gages in a Force/Torque sensor for thermal drift. A circuit includes a plurality of first stages connected in parallel. Each first stage is configured to output a respective voltage at a node connecting a fixed resistor and a load-sensing strain gage in series between positive and negative power supply voltages. The circuit also includes a second stage connected in parallel with the first stages. The second stage is configured to output a voltage at a node connecting a fixed resistor and an unstressed strain gage in series between positive and negative power supply voltages. The output voltage of the second stage and each first stage is measured, and the second stage output voltage is subtracted from each first stage output voltage, over a predetermined temperature range. In response to at least one load-sensing strain gage exhibiting an effective temperature coefficient, of the polarity opposite that of the power supply connected to the fixed resistors, relative to the unstressed strain gage, an unstressed trimming resistor is added in parallel across the unstressed strain gage. The value of the unstressed trimming resistor is selected so as to substantially eliminate an effective temperature coefficient, of the polarity opposite of the power supply connected to the fixed resistors, relative to the unstressed strain gage, of all load-sensing strain gages over the predetermined temperature range. For each load-sensing strain gage, in response to the load-sensing strain gage exhibiting an effective temperature coefficient, of the polarity of the power supply connected to the fixed resistors, relative to the unstressed strain gage, a load-sensing trimming resistor is added in parallel across the load-sensing strain gage. The value of the load-sensing trimming resistor is selected so as to substantially eliminate an effective temperature coefficient, of the polarity of the power supply connected to the fixed resistors, relative to the unstressed strain gage, of the load-sensing strain gage over the predetermined temperature range.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
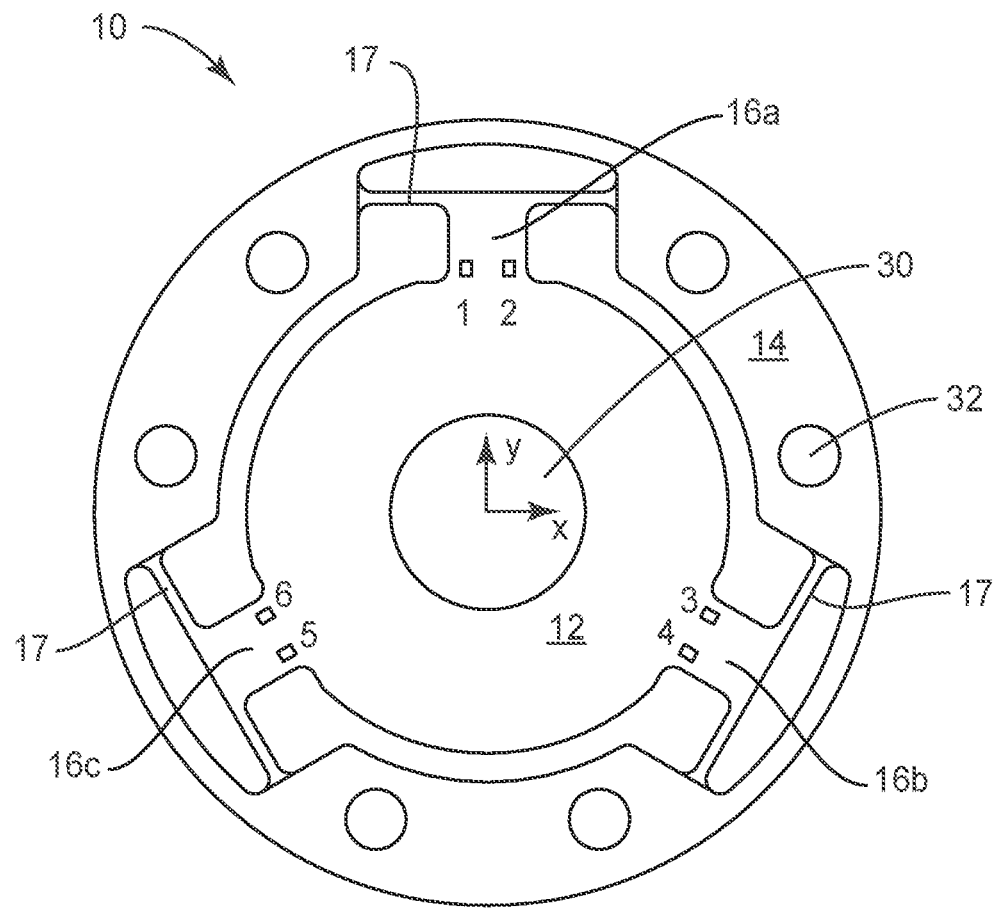
FIG. 1 is a section view of a prior art Force/Torque sensor showing load-sensing strain gages.
Figure 2:
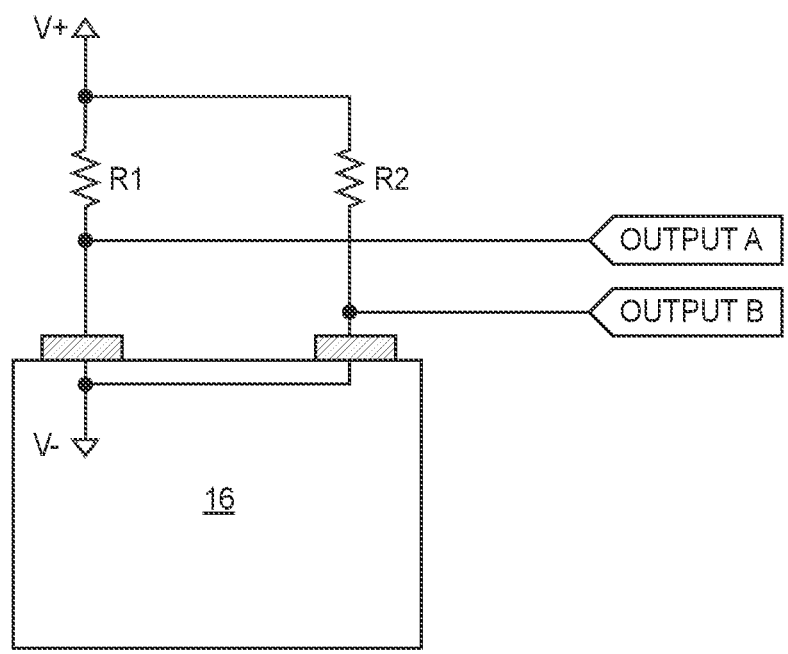
FIG. 2 is a diagram of strain gages in a prior art quarter-bridge circuit.
Figure 3:
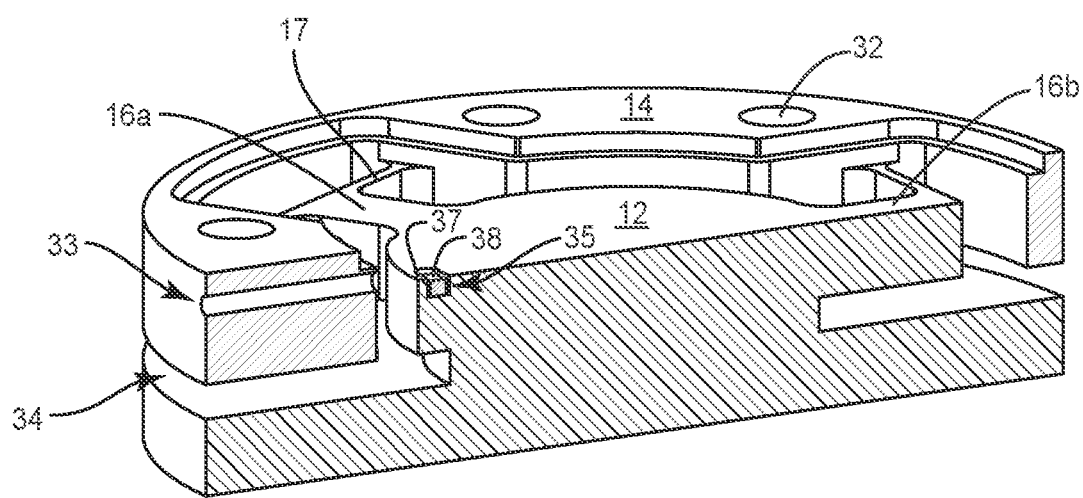
FIG. 3 is a perspective section view of a prior art Force/Torque sensor showing an unstressed strain gage.
Figure 4:
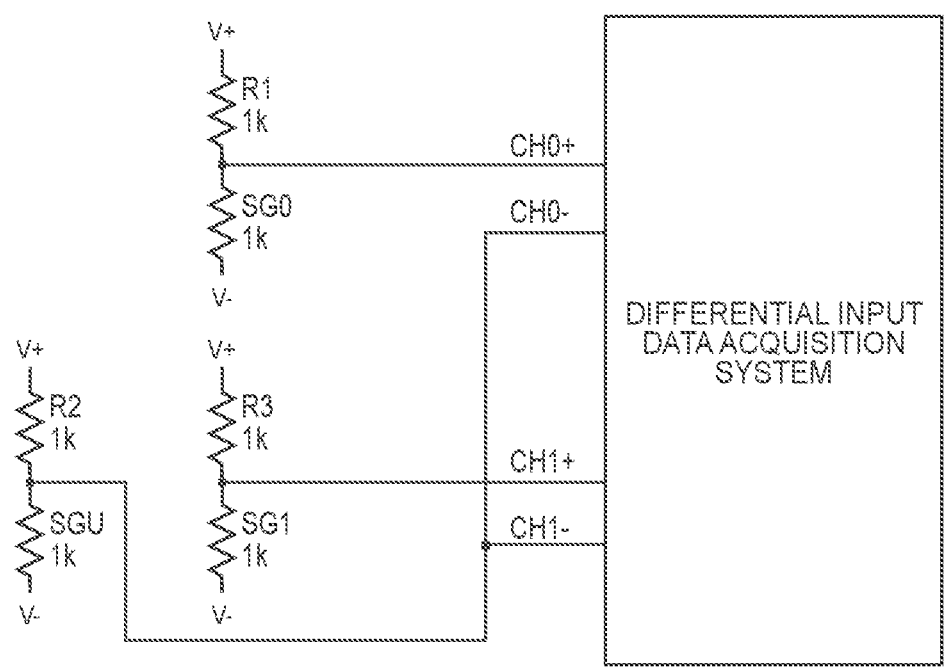
FIG. 4 is a prior art circuit diagram showing the subtraction of an unstressed strain gage signal from two load-sensing strain gage signal.

Embodiments of the present invention are described herein in the context of a compact Force/Torque (F/T) sensor described in the above-incorporated U.S. Pat. No. 10,422,707 ("the '707 patent"). However, the present invention is not limited to this application, and those of skill in the art will readily recognize that embodiments may be advantageously applied to a wide variety of F/T sensors. FIGS. 1-3 herein are reproduced from FIGS. 1, 3, and 8 of the '707 patent, respectively, and FIG. 4 is reproduced from FIG. 2 of the '668 PCT publication. For clarity of explanation, the numbering of elements in the '707 patent is adopted here.

FIG. 1 depicts a plan view of one embodiment of an F/T sensor 10. A TAP 12 is connected to a MAP 14 by three deformable beams 16a, 16b, 16c. In the embodiment depicted, each beam 16 connects directly to the TAP 12, and connects to the MAP 14 by thin flexures 17, which aid in the deformation of the beams 16 under mechanical loading. The TAP 12 is configured to be connected to a first object, such as a robotic tool, via a through-hole 30. The MAP 14 is configured to be connected to a second object, such as a robot arm, via a plurality of mounting holes 32. The TAP 12 and MAP 14 are only connected by the beams 16 and flexures 17.

Affixed to (only) the upper surface of each beam 16a-c are load-sensing strain gages 1-6. As used herein, the term "load-sensing strain gage" refers to a strain gage mounted to a member of the F/T sensor (such as a deformable beam 16) that experiences mechanical stress as the F/T sensor measures applied forces and/or torques. In other embodiments, load-sensing strain gages may be mounted to multiple surfaces of a deformable beam 16—e.g., on opposite surfaces thereof (e.g., opposite sides; top and bottom). The F/T sensor 10 also includes processing circuitry (not shown) operative to receive electrical signals from each load-sensing strain gage 1-6, and to process the signals to resolve the magnitude and direction of force(s) and torque(s) applied between the MAP 14 and TAP 12. Such processing circuits may comprise, e.g., a microprocessor coupled to memory operative to store program code and sensor data.

FIG. 2 depicts two load-sensing strain gages wired in a quarter-bridge configuration. As described in the '707 patent, this circuit configuration is sufficient to discriminate, from changes in the resistances $R_{LSn}$ of the two load-sensing strain gages, whether the portion of beam 16 surface to which each load-sensing strain gage is mounted is in tension or compression. Comparison of this information for all six load-sensing strain gages is sufficient to determine the forces Fx, Fy, Fz and torques Tx, Ty, Tz.

FIG. 3 depicts an unstressed strain gage 38. The unstressed strain gage 38 is mounted to an extension 37, formed by creating a void 35 in the TAP 12. The extension 37 experiences no deformation due to any force or torque applied to or experienced by the F/T sensor 10. Accordingly, any change in resistance of the unstressed strain gage 35 is caused by temperature change. As used herein, the term "unstressed strain gage" means a strain gage, otherwise substantially similar to a load-sensing strain gage, that is mounted to a member of the F/T sensor that experiences substantially no mechanical stress as the F/T sensor measures applied forces and/or torques.

FIG. 4 depicts two load-sensing strain gages SG0 and SG1 in a quarter-bridge circuit configuration. The load-sensing strain gage signals are partially compensated for thermal drift by subtracting out the signal from an unstressed strain gage SGU, also wired in a quarter-bridge circuit. Although this subtraction of the unstressed strain gage SGU signal improves performance of the F/T sensor over temperature changes, the change in resistance of each load-sensing strain gage SG0, SG1 over temperature does not exactly match that of the unstressed strain gage SGU. Accordingly, some of the load-sensing strain gages SG0, SG1 exhibit an effective temperature coefficient, relative to the unstressed strain gage, as the F/T sensor undergoes temperature changes. This effective temperature coefficient deleteriously affects force and torque measurements as the F/T sensor temperature changes.

Figure 5:
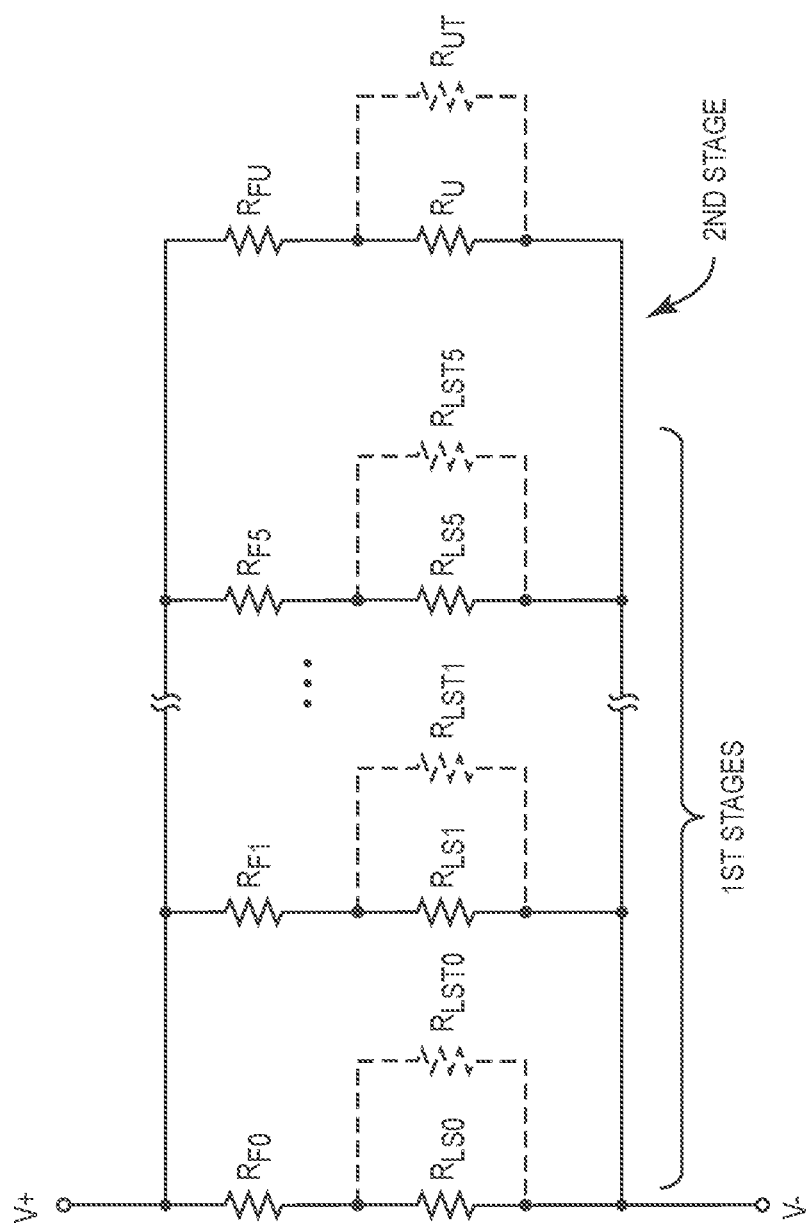
FIG. 5 is a circuit schematic showing the quarter-bridge circuits of six load-sensing strain gages and an unstressed strain gage.

FIG. 5 depicts a circuit for measuring changes in resistance of load-sensing strain gages in an F/T sensor, and possible trimming resistors for compensating out thermal drift. A plurality of first stages is connected in parallel, wherein each first stage is configured to output a respective voltage at a node connecting a fixed resistor and a load-sensing strain gage in series between positive and negative power supply voltages. The resistance of the $i^{th}$ load-sensing strain gage is denoted $R_{LSi}$ (i.e., $R_{LS0}$, $R_{LS1}$, ... $R_{LS(n-1)}$). In the circuit depicted, n=6, although this is not a limitation of the present invention. Although the variable $R_{LSi}$ properly refers only to the resistance of the $i^{th}$ load-sensing strain gage, for convenience in the following discussion, the strain gage itself is sometimes denoted as $R_{LSi}$ (and the load-sensing strain gages collectively are denoted $R_{LS}$). Each of then load-sensing strain gages $R_{LS0}$, $R_{LS1}$, ... $R_{LS(n-1)}$ is connected in series to a corresponding fixed resistor $R_{F0}$, $R_{F1}$, ..., $R_{F(n-1)}$. Note that in the circuit configuration of FIG. 5, the fixed resistors are connected to the positive voltage supply; in other embodiments, the fixed resistors may be connected to the negative voltage supply. In practice, all of the fixed resistors $R_F$ may have the same value, such as 1 kΩ. In one embodiment, the values of fixed resistors $R_F$ may be altered to maintain voltage measurements within a preferred range, as discussed in greater detail herein.

The first stages are connected in parallel between applied source voltages V+ and V−. A quarter-bridge circuit is formed by taking voltage measurements at the mid-points of each first stage, between the load-sensing strain gage $R_{LSi}$ and fixed resistor $R_{Fn}$.

A second stage is connected in parallel with the first stages. The second stage is configured to output a voltage at a node connecting a fixed resistor $R_{FU}$ and an unstressed strain gage $R_U$ in series between the positive and negative supply voltages. The fixed resistor $R_{FU}$ is connected to the positive power supply voltage. In practice, the fixed resistor $R_{FU}$ may have the same value as the fixed resistors $R_F$ in the first stages. The unstressed strain gage $R_U$ is substantially similar to the load-sensing strain gages $R_{LS}$—the only difference is that it is mounted to a member of the F/T sensor that experiences no mechanical stress under applied forces or torques.

The output of each strain gage $R_{LSi}$, $R_U$ is the voltage measured at mid-point of the corresponding stage. As depicted in FIG. 4, the second stage output voltage is subtracted from each first stage output voltage. From this, with known values of the fixed resistors $R_{Fn}$, $R_{FU}$, changes in resistance of the load-sensing strain gages $R_{LSn}$—and hence the applied forces and torques causing mechanical stresses—can be calculated. A compensation procedure described herein substantially eliminates, for each load-sensing strain gage $R_{LSi}$, any effective temperature coefficient, relative to the unstressed strain gage $R_U$, to substantially eliminate thermal drift from the force/torque measurements.

As noted, the fixed resistors $R_{Fn}$, $R_{FU}$ are connected to the positive voltage supply. This determines the direction—i.e., positive or negative, also referred to herein as the "polarity"—of relative temperature drift between load-sensing strain gages $R_{LSn}$ and the unstressed strain gage $R_U$ with increasing temperature. This relative thermal drift—more precisely, the difference in rate of change in resistance with increasing temperature of a load-sensing strain gage $R_{LSi}$, relative to the unstressed strain gage $R_U$—is referred to herein as an effective temperature coefficient of the load-sensing strain gages $R_{LSn}$, relative to the unstressed strain gage $R_U$. The direction, or polarity, of the effective temperature coefficient depends on whether the fixed resistors $R_{Fn}$, $R_{FU}$ are connected to the positive or negative supply voltage. For clarity of explanation herein, the circuit configuration of FIG. 5 is assumed, wherein the fixed resistors $R_{Fn}$, $R_{FU}$ are connected to the positive voltage supply.

FIG. 5 depicts a possible trimming resistor $R_{LST}$ connected in parallel across each load-sensing strain gage $R_{LS}$, and a possible trimming resistor $R_{UT}$ connected in parallel across the unstressed strain gage $R_U$. The trimming resistors $R_{LST}$, $R_{UT}$ are depicted in dashed-line to indicate that each one may or may not be added to any given strain gage during a temperature compensation procedure. Any trimming resistors across the load-sensing strain gages $R_{LSn}$ are referred to herein as load-sensing trimming resistors $R_{LST}$, and any trimming resistor across the unstressed strain gage $R_U$ is referred to herein as an unstressed trimming resistor $R_{UT}$ (the load-sensing trimming resistors $R_{LST}$ do not sense any load, and whether the unstressed trimming resistor $R_{UT}$ experiences mechanical stress is irrelevant—the terms, as applied to the trimming resistors, are for reference only). The values of any trimming resistors $R_{LST}$, $R_{UT}$ are determined in an iterative process over changes in temperature, which in some embodiments may be simulated.

According to embodiments of the present invention, the load-sensing strain gages $R_{LS}$ are temperature-compensated to substantially eliminate an effective temperature coefficient, relative to the unstressed strain gage $R_U$, over a predetermined temperature range. For the circuit configuration of FIG. 5, adding a trimming resistor $R_{UT}$ to the unstressed strain gage $R_U$ increases the effective temperature coefficient of all load-sensing strain gages $R_{LS}$, relative to the unstressed strain gage $R_U$. Also, for this circuit configuration, adding a trimming resistor to a load-sensing strain gage $R_{LSi}$ decreases the effective temperature coefficient of that load-sensing strain gage $R_{LSi}$, relative to the unstressed strain gage $R_U$.

Initially, with no mechanical load applied, the outputs of each first stage and the second stage are measured, and the second stage output voltage is subtracted from each first stage output voltages, as the sensor is heated across a predetermined temperature range. In the unlikely event that the resistance value changes of all load-sensing strain gages $R_{LS}$ precisely match those of the unstressed strain gage $R_U$, then no compensation is necessary. In most real-world cases, at least one load-sensing strain gage $R_{LSi}$ will exhibit a negative effective temperature coefficient, relative to the unstressed strain gage, over the predetermined temperature range.

Figure 6:
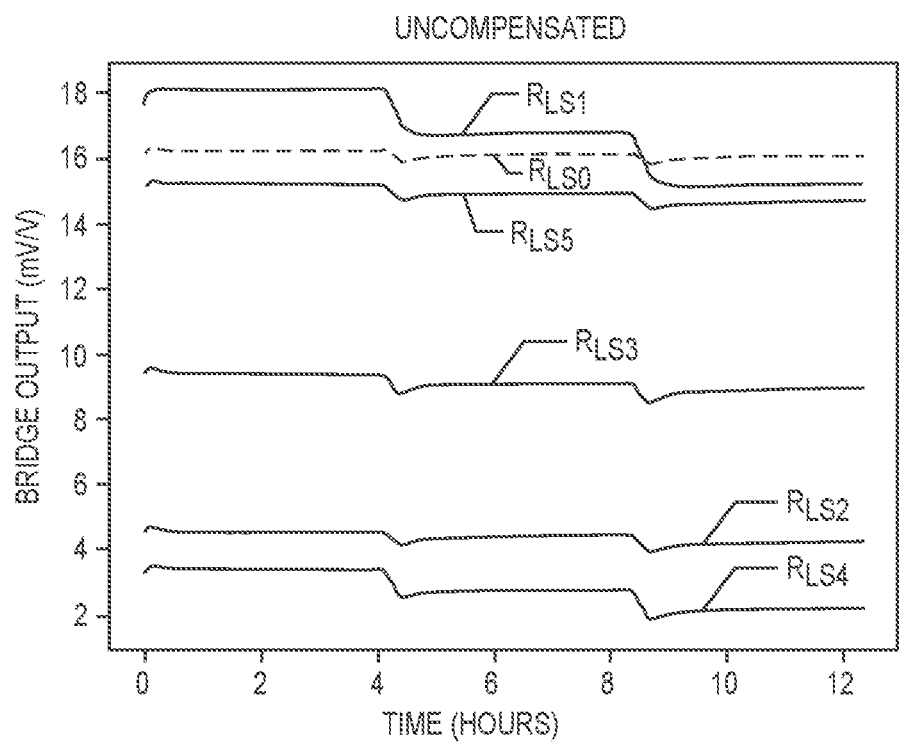
FIG. 6 is a graph of measured strain gage responses over temperature, prior to compensation.

FIG. 6 plots the responses, over increasing temperature, of each load-sensing strain gage $R_{LSi}$. As used herein, the response of a load-sensing strain gage $R_{LSn}$ is the difference between the output voltage of the corresponding first stage and the output voltage of the second stage, normalized by the excitation voltage (the difference between V+ and V−). The responses are measured over increasing temperature. For example, the graph of $R_{LS0}$ is a time-series plot of the values $$\frac{V_{R_{LS0}} - V_{R_U}}{V_{excitation}}$$

in units mV/V, as the F/T sensor body is heated over a predetermined temperature range. Since the value of each fixed resistor $R_{Fi}$ is known, the resistance values of the strain gages $R_{LS}$, relative to that of $R_U$, are easily calculated from the measured voltages and Ohm's law. In another embodiment, the resistance of each load-sensing strain gage $R_{LSi}$ may be directly measured at numerous points over the predetermined temperature range. In the example of FIG. 6, $R_{LS1}$ has the greatest negative effective temperature coefficient—that is, the corresponding first stage outputs the greatest decrease in voltage, relative to the second stage, with increasing temperature. Note that because the plots of $R_{LS0}$ and $R_{LS1}$ cross, the plot of $R_{LS0}$ is rendered with a dashed line in FIGS. 6-9, to avoid confusion.

A value of an unstressed trimming resistor $R_{UT}$ is then determined, which flattens the response, over temperature, of the load-sensing strain gage $R_{LS1}$ exhibiting the greatest negative effective temperature coefficient, relative to the unstressed strain gage $R_U$ (denoted, in the general case for the circuit of FIG. 5, as $R_{LSmax-neg}$). In one embodiment, determining the value of the unstressed trimming resistor $R_{UT}$ comprises performing a binary search of resistance values, substituting a new value of the unstressed trimming resistor $R_{UT}$ for the current value, and measuring or simulating the outputs of the first stages across the predetermined temperature range for each iteration of a different value of $R_{UT}$, until an $R_{UT}$ value is found that results in a substantially zero effective temperature coefficient of the most-negative load-sensing strain gage $R_{LSmax-neg}$ (which is $R_{LS1}$ in FIG. 6) across the predetermined temperature range.

Figure 7:
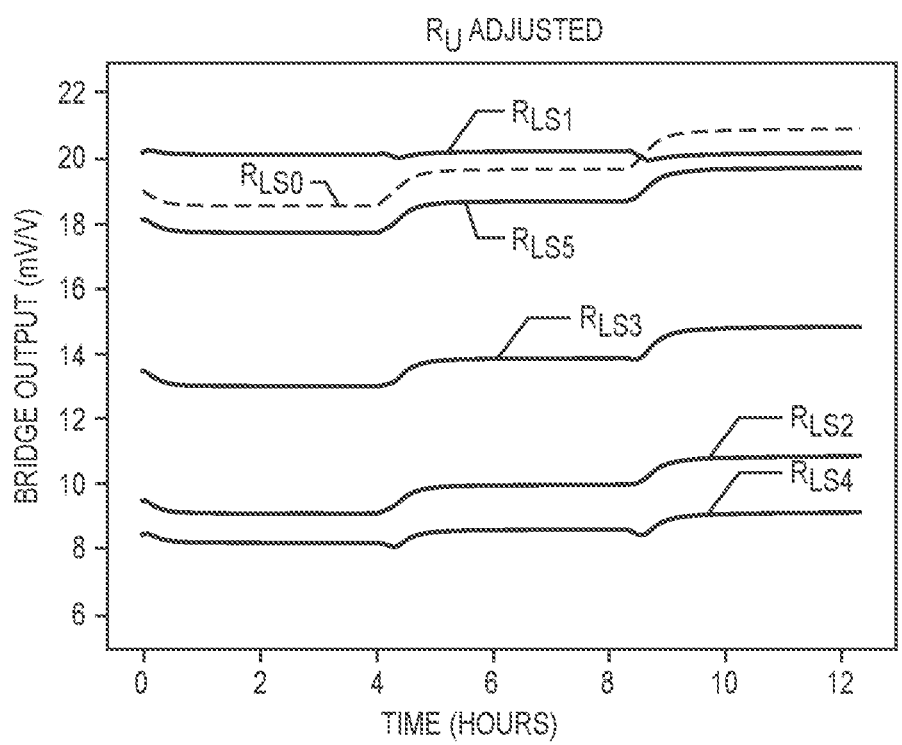
FIG. 7 is a graph of simulated changes to the measured strain gage responses over temperature, with the responses partially compensated to remove negative effective temperature coefficients.

FIG. 7 shows the load-sensing strain gage $R_{LS}$ responses after the determined unstressed trimming resistor $R_{UT}$ is connected across the unstressed strain gage $R_U$. The response of the load-sensing strain gage $R_{LS1}$, formerly exhibiting the most-negative effective temperature coefficient, is now substantially constant across the predetermined temperature range. However, the addition of the unstressed trimming resistor $R_{UT}$ increased the effective temperature coefficient of all other load-sensing strain gages $R_{LS}$, relative to the unstressed strain gage $R_U$. That is, the remaining first stages now output a greater increase in voltage with increasing temperature than does the second stage.

Next, a load-sensing trimming resistor $R_{LST}$ is connected in parallel across each load-sensing strain gage $R_{LS}$ exhibiting a positive effective temperature coefficient, relative to the unstressed strain gage $R_U$. For each of the first stages, a value of the load-sensing trimming resistor $R_{LSTi}$ is determined, which results in a substantially flat response across the predetermined temperature range for that load-sensing strain gage $R_{LSi}$. Here also, a binary search may be applied, substituting a new value of load-sensing trimming resistor $R_{LSTi}$, and measuring or simulating the resistance of the load-sensing strain gage $R_{LSi}$ across the predetermined temperature range at each iteration.

Figure 8:
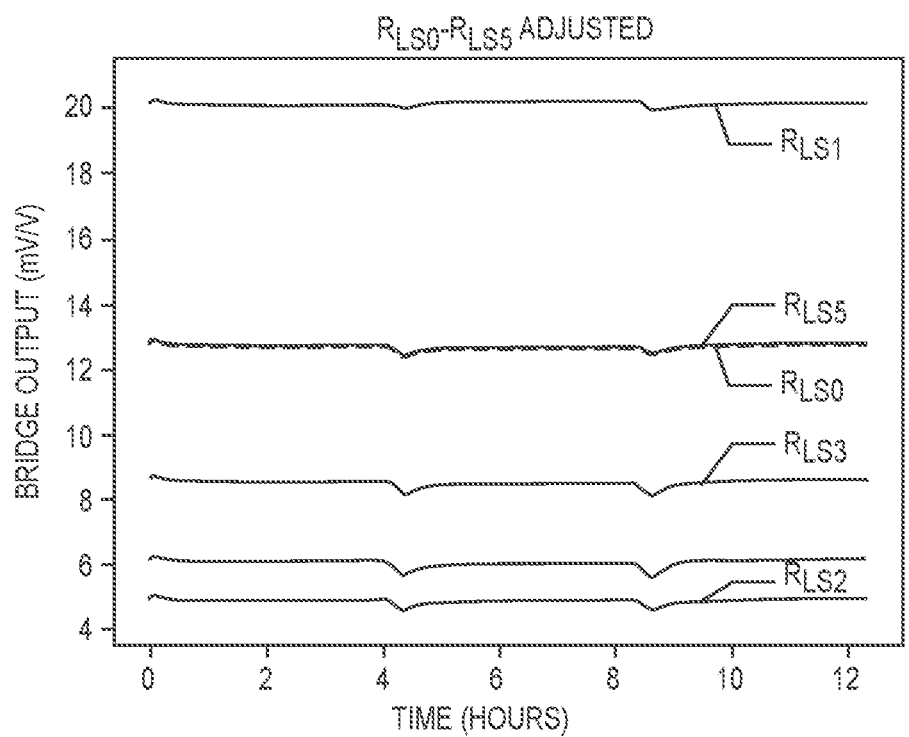
FIG. 8 is a graph of simulated changes to the measured strain gage responses over temperature, with the responses fully compensated to also remove positive effective temperature coefficients.

FIG. 8 shows the temperature-compensated load-sensing strain gage $R_{LS}$ responses after one iteration of the compensation procedure is complete. All of the load-sensing strain gages $R_{LS}$ exhibit a substantially constant response across the predetermined temperature range (note that, in this example, the plots of $R_{LS0}$ and $R_{LS5}$ overlap).

Figure 9:
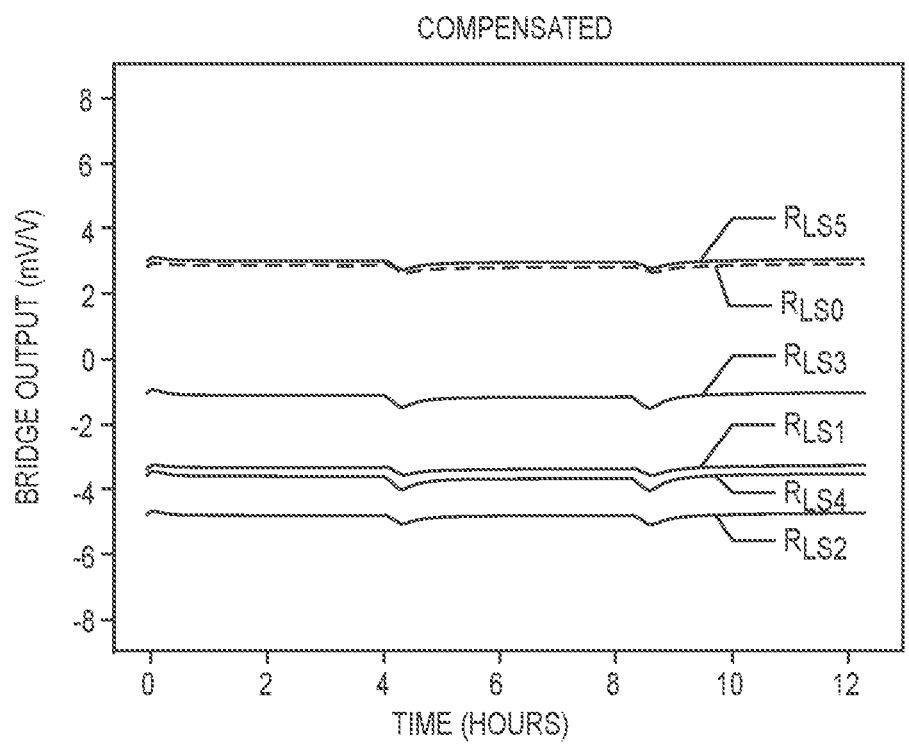
FIG. 9 is a graph of simulated changes to the measured strain gage responses of FIG. 8, after multiple iterations of the compensation procedure.

FIG. 9 shows the temperature-compensated load-sensing strain gage $R_{LS}$ responses after several iterations of the compensation procedure. The responses are even flatter—that is, all of the load-sensing strain gages $R_{LS}$ exhibit substantially zero effective temperature coefficient, relative to the unstressed strain gage $R_U$. Additionally, the responses are more centered around zero mV/V.

Those of skill in the art will note that the temperature compensation procedure described above relates to the quarter-bridge circuit configuration of FIG. 5. In particular, in that circuit configuration, the fixed resistors $R_{Fn}$, $R_{FU}$ are connected to the positive voltage supply. If the power supply voltages were reversed, with the fixed resistors $R_{Fn}$, $R_{FU}$ connected to the negative voltage supply, then the opposite bridge output changes would occur. That is, addition of an unstressed trimming resistor $R_{UT}$ across the unstressed strain gage $R_U$ would decrease the effective temperature coefficient of the load-sensing strain gages $R_{LSn}$, relative to the unstressed strain gage $R_U$. Additionally, the addition of a load-sensing trimming resistor $R_{LSTi}$ across a load-sensing strain gage $R_{LSi}$ would increase the effective temperature coefficient of that load-sensing strain gage $R_{LSi}$, relative to the unstressed strain gage $R_U$.

Hence, in the general case, the value of the unstressed trimming resistor $R_{UT}$ is selected so as to substantially eliminate an effective temperature coefficient, of the polarity opposite that of the power supply voltage connected to the fixed resistors $R_{Fn}$, $R_{FU}$, of all load-sensing strain gages $R_{LSn}$, relative to the unstressed strain gage $R_U$, over a predetermined temperature range. Additionally, in general, the value of each load trimming resistor $R_{LSTi}$ is selected so as to substantially eliminate an effective temperature coefficient, of the polarity of the power supply voltage connected to the fixed resistors $R_{Fn}$, $R_{FU}$, of the associated load-sensing strain gage $R_{LSi}$, relative to the unstressed strain gage $R_U$, over the predetermined temperature range.

Figure 10:
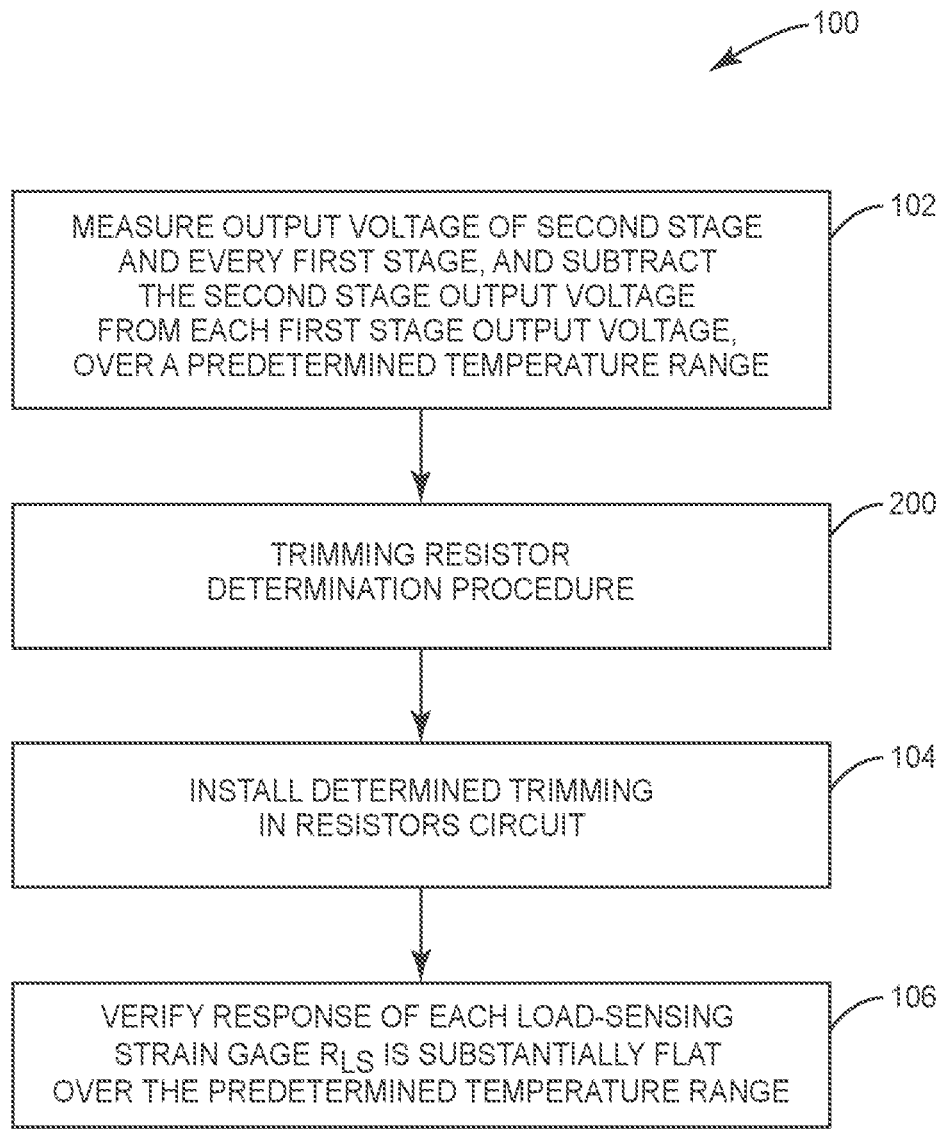
FIG. 10 is a flow diagram of a method of compensating a plurality of load-sensing strain gages in a Force/Torque sensor for thermal drift.

FIG. 10 is a flow diagram of steps in a method 100 of compensating a plurality of load-sensing strain gages $R_{LS}$ in an F/T sensor for thermal drift. The method operates in a circuit comprising a plurality of first stages connected in parallel. Each first stage i is configured to output a respective voltage at a node connecting a fixed resistor $R_{Fi}$ and a load-sensing strain gage $R_{LSi}$ in series between positive and negative power supply voltages. The circuit includes a second stage connected in parallel with the first stages. The second stage is configured to output a voltage at a node connecting a fixed resistor $R_{FU}$ and an unstressed strain gage $R_U$ in series between positive and negative power supply voltages.

The output voltage of the second stage, and of each first stage, are measured, and the second stage output voltage is subtracted from each first stage output voltage, over a predetermined temperature range (block 102).

The need for, and values of, any trimming resistors for the various strain gages are determined in a trimming resistor determination procedure (block 200) described below. In one embodiment, the procedure 200 is performed in a computer simulation of the circuit. In one embodiment, the circuit is modeled, and operation of the circuit over the predetermined temperature range is simulated, in the Python language, although those of skill in the art may implement a model and simulation in any of a variety of programming languages and/or circuit simulation programs. Alternatively, the procedure 200 may be performed using discrete resistors or potentiometers, iteratively thermally cycling the circuit as required to converge on trimming resistor values, as described more fully herein.

Once the need for, and if so, values of, all trimming resistors are determined from the trimming resistor determination procedure (block 200), the determined trimming resistors $R_{UT}$, $R_{LSTn}$ are installed in the circuit (block 104). The circuit is then cycled across the predetermined temperature range, and the responses of the load-sensing strain gages $R_{LS}$ measured to verify that they remain substantially constant (block 106).

Figure 11:
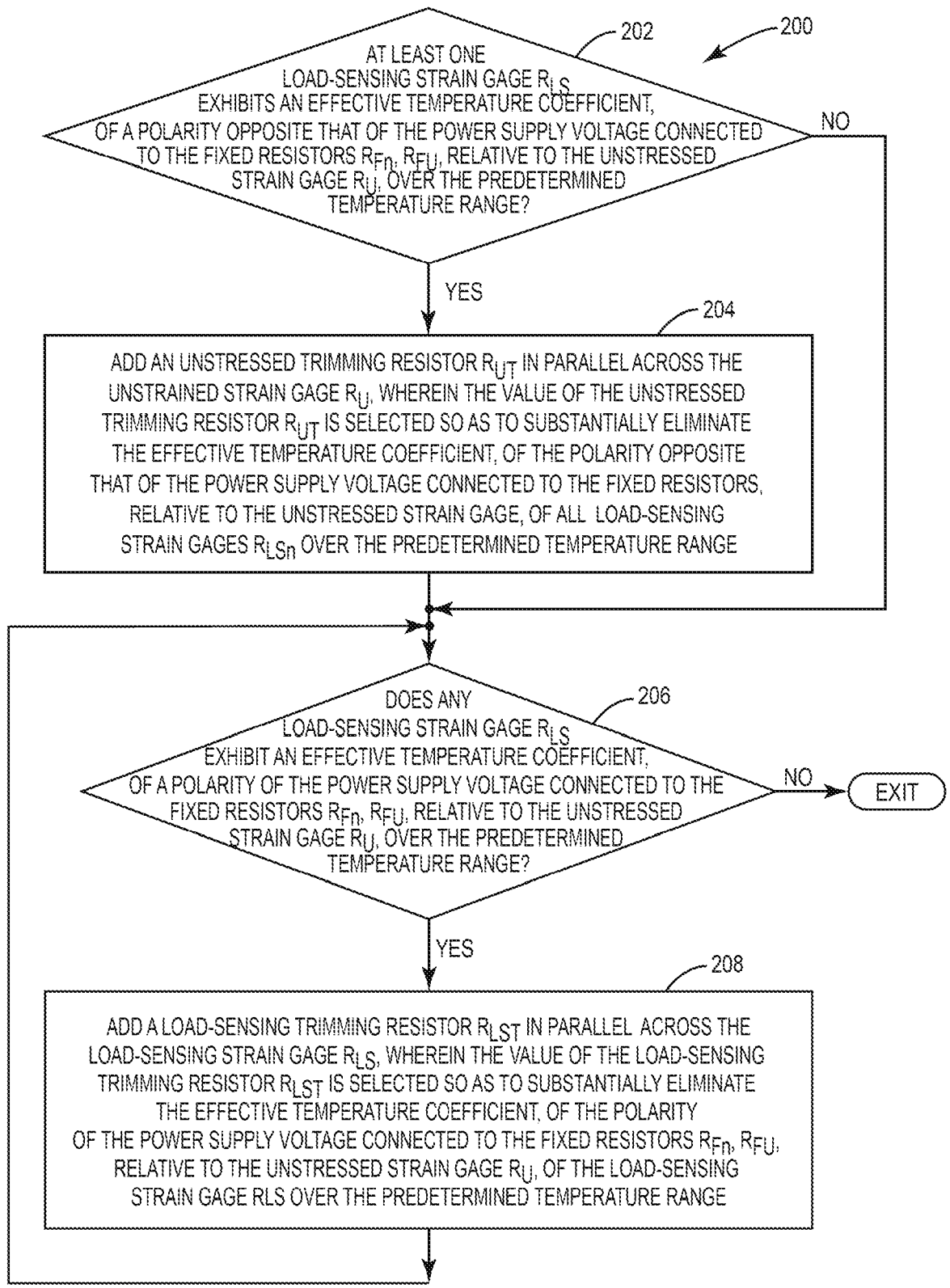
FIG. 11 is a flow diagram of a trimming resistor determination procedure.

FIG. 11 depicts the steps in one embodiment of the trimming resistor determination procedure 200. FIG. 11, and the following description of the trimming resistor determination procedure 200, describe the most general case, and are not limited to the circuit configuration of FIG. 5 (where the fixed resistors $R_{Fn}$, $R_{FU}$ are connected to the positive power supply voltage). If, during the measurement process of block 104 of method 100 (FIG. 10), at least one load-sensing strain gage $R_{LS}$ exhibits an effective temperature coefficient, of a polarity opposite that of the power supply voltage connected to the fixed resistors, relative to the unstressed strain gage Ru (block 202), an unstressed trimming resistor $R_{UT}$ is added in parallel across the unstressed strain gage $R_U$. The value of the unstressed trimming resistor $R_{UT}$ is selected so as to substantially eliminate the effective temperature coefficient, of the polarity opposite that of the power supply voltage connected to the fixed resistors, relative to the unstressed strain gage $R_U$, of all load-sensing strain gages $R_{LS}$ over the predetermined temperature range (block 204).

In one embodiment, determination of the value of the unstressed trimming resistor $R_{UT}$ is performed by first identifying a load-sensing strain gage $R_{LSmax}$ that exhibits the greatest effective temperature coefficient, of a polarity opposite that of the power supply voltage connected to the fixed resistors, relative to the unstressed strain gage $R_U$. A first unstressed trimming resistor $R_{UT1}$ is added in parallel across the unstressed strain gage $R_U$, and the response of the identified load-sensing strain gage $R_{LSmax}$ is again measured over the predetermined temperature range. If this load-sensing strain gage $R_{LSmax}$ still exhibits an effective temperature coefficient, of a polarity opposite that of the power supply voltage connected to the fixed resistors, a different unstressed trimming resistor $R_{UT2}$ is substituted for the current unstressed trimming resistor. In one embodiment, the values of j successive unstressed trimming resistors $R_{UTj}$ are selected via a binary search. The steps of measuring the response over the predetermined temperature range, and substituting a different unstressed trimming resistor $R_{UTj}$, are iteratively repeated until the identified load-sensing strain gage $R_{LSmax}$ exhibits a substantially zero effective temperature coefficient (or a small temperature coefficient of the polarity of the power supply voltage connected to the fixed resistors). The value of the final unstressed trimming resistor $R_{UT}$ is stored, as are the responses of all load-sensing strain gages $R_{LS}$ during the last measurement iteration.

The trimming resistor determination procedure 200 then determines whether any of the first stages of the circuit require the addition of load-sensing trimming resistors $R_{LST}$, and if so, their values. The unstressed trimming resistor $R_{UT}$ was selected to zero the effective temperature coefficient of the identified load-sensing strain gage $R_{LSmax}$. Accordingly, the effective temperature coefficients of most, if not all, of the remaining load-sensing strain gages $R_{LS}$ are now likely to be non-zero, and of the polarity of the power supply connected to the fixed resistors.

If, during the last measurement iteration in block 204, any load-sensing strain gage $R_{LSi}$ exhibits an effective temperature coefficient, of the polarity of the power supply voltage connected to the fixed resistors, relative to the unstressed strain gage $R_U$ (block 206), a load-sensing trimming resistor $R_{LSTi}$ is added in parallel across that load-sensing strain gage $R_{LSi}$. The value of the load-sensing trimming resistor $R_{LSTi}$ is selected so as to substantially eliminate the effective temperature coefficient, relative to the unstressed strain gage $R_U$, of the associated load-sensing strain gage $R_{LSi}$ over the predetermined temperature range (block 208).

Similar to the determination of the unstressed trimming resistor $R_{UT}$, in one embodiment, determination of the value of each load-sensing trimming resistor $R_{LSTi}$ is performed in an iterative measure/substitute process. For each $i^{th}$ load-sensing strain gage $R_{LSi}$ exhibiting an effective temperature coefficient, of the polarity of the power supply voltage connected to the fixed resistors, relative to the unstressed strain gage $R_U$, a first load-sensing trimming resistor $R_{LST1}$ is added in parallel across the associated load-sensing strain gage $R_{LSi}$. The response of at least that load-sensing strain gage $R_{LSi}$ is again measured over the predetermined temperature range. If the load-sensing strain gage $R_{LSi}$ still exhibits an effective temperature coefficient, a different load-sensing trimming resistor $R_{LST2}$ is substituted for the current load-sensing trimming resistor across that load-sensing strain gage $R_{LSi}$. In one embodiment, the values of j successive load-sensing trimming resistors $R_{LSTj}$ are selected via a binary search. The steps of measuring the responses over the predetermined temperature range, and substituting different load-sensing trimming resistors $R_{UTj}$, are iteratively repeated until the $i^{th}$ load-sensing strain gage $R_{LSi}$ exhibit a substantially zero effective temperature coefficient, relative to the unstressed strain gage $R_U$. The process is then repeated for the next first stage, until all n load-sensing strain gages which exhibit an effective temperature coefficient, of the polarity of the power supply connected to the fixed resistors, are compensated.

Alternatively, the values of all load-sensing trimming resistors $R_{LSTn}$ may be changed simultaneously, and the strain gage responses then measured over a thermal cycle. The values of all of the final load-sensing trimming resistors $R_{LST}$ are stored. As discussed above with respect to the method 100 of FIG. 10, trimming resistors having these values are installed in the circuit (block 104) and the temperature stability is verified (block 106).

Adding trimming resistors $R_{LST}$, $R_{UT}$ may, in some cases, result in outputs that fall outside a desired voltage range. In one embodiment, in this case, the value(s) of one or more fixed resistors $R_F$, $R_{FU}$ are altered, to bring the output voltage within the desired range. In this case, any trimming resistors $R_{LSTn}$, $R_{UT}$ are removed, a measurement cycle is performed, measuring the responses of all load-sensing strain gages $R_{LS}$ over the predetermined temperature range, and the trimming resistor determination procedure 200 is then restarted at block 202, and performed again with the updated fixed resistor values $R_F$, $R_{FU}$.

Returning to FIG. 5, after execution of the compensation procedure, e.g., the method 100, there are several possible configurations of trimming resistors $R_{LSTn}$, $R_{UT}$, depending on the responses measured during the compensation procedure. As mentioned above, in the unlikely event that the first measurement reveals all load-sensing strain gages $R_{LS}$ exhibit zero effective temperature coefficient, relative to the unstressed strain gage $R_U$, no trimming resistors $R_{LST}$ or $R_{UT}$ are required.

Another possibility is that all effective temperature coefficients of one or more load-sensing strain gages $R_{LS}$ are zero or positive. In this case, no unstressed trimming resistor $R_{UT}$ is added to the unstressed strain gage $R_U$, although load-sensing trimming resistors $R_{LST}$ will be added across one or more load-sensing strain gages $R_{LS}$.

In the general case, a load-sensing strain gage $R_{LSmax}$ initially exhibits the greatest negative effective temperature coefficient, prompting the addition of an unstressed trimming resistor $R_{UT}$ to the unstressed strain gage $R_U$, to make the response of that strain gage $R_{LSmax}$ substantially constant over the predetermined temperature range (i.e., zeroing out its effective temperature coefficient, relative to the unstressed strain gage $R_U$). This may cause a positive effective temperature coefficient for most or all of the other load-sensing strain gages $R_{LS}$, prompting load-sensing trimming resistors $R_{LST}$ to be added to them. Hence, up to (n−1) first stages may include load-sensing trimming resistors $R_{LST}$, with the one exception being the load-sensing strain gage $R_{LSmax}$ initially zeroed by the unstressed trimming resistor $R_{UT}$. Even in this case, however, as a practical matter, because the available values of unstressed trimming resistors $R_{UT}$ are discrete, a value may be chosen that gives this load-sensing strain gage $R_{LSmax}$ a slightly positive effective temperature coefficient, rather than zero, prompting the addition of a load-sensing trimming resistor $R_{LST}$ to it as well.

Figure 12A:
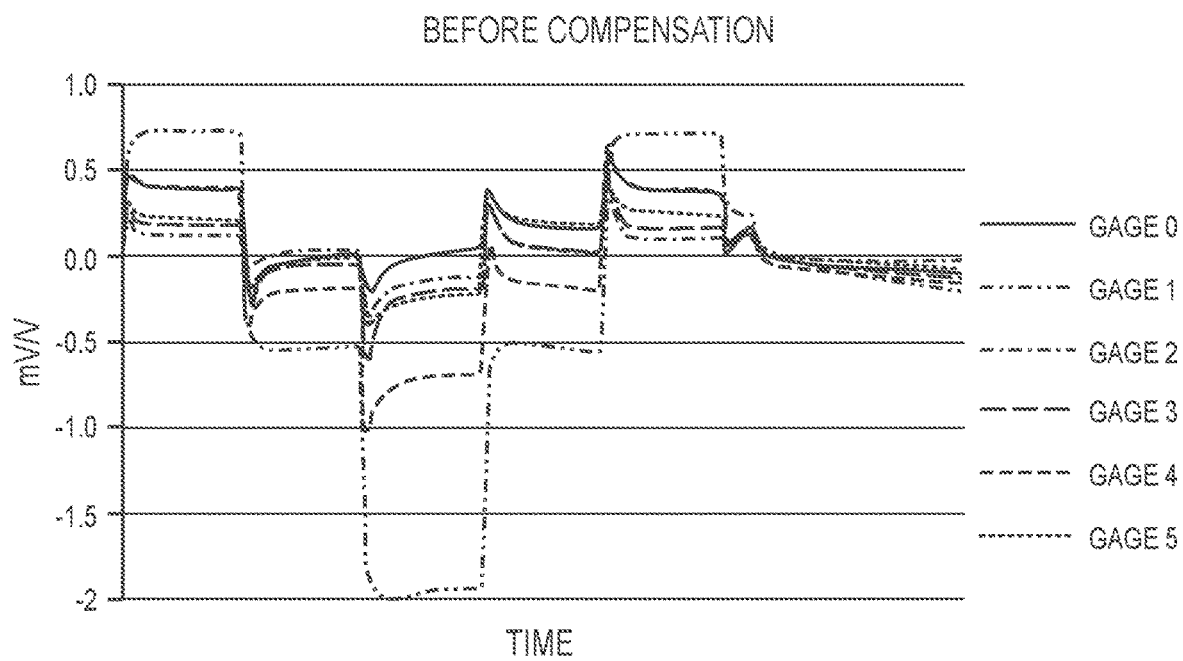
FIG. 12A is a graph of measured strain gage responses over temperature prior to temperature compensation.
Figure 12B:
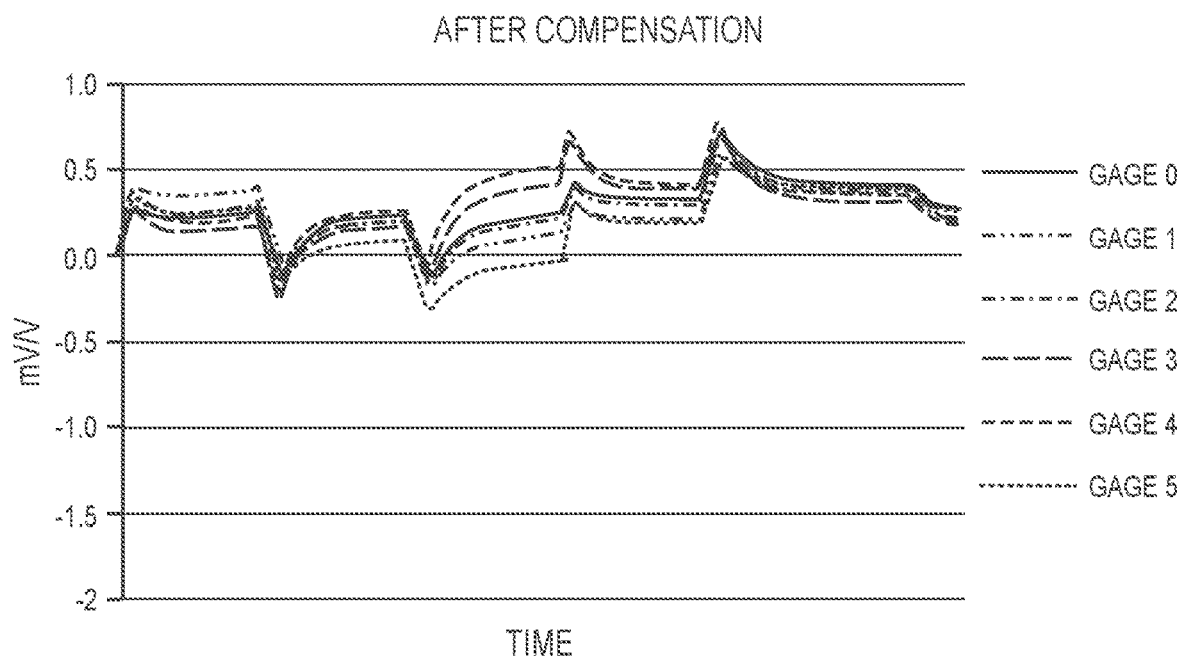
FIG. 12B is a graph of measured strain gage responses over temperature after temperature compensation.

The data plotted in FIG. 6 were measured from a representative F/T sensor. The changes in the circuit of FIG. 5 (i.e., the addition of, and adjustments of values of, trimming resistors $R_{LSTn}$, $R_{UT}$) were simulated using a model of the circuit. Accordingly, the strain gage responses plotted in FIGS. 7-9 reflect simulated data. In contrast, FIGS. 12A and 12B depict measured strain gage responses for an F/T sensor prior to and after the thermal compensation method 100, respectively, wherein the added and adjusted trimming resistors were actual hardware, and the strain gage responses were measured over the predetermined temperature range. These graphs show the dramatic improvement in thermal drift achieved by embodiments of the present invention.

Embodiments of the present invention present numerous advantages over the prior art. By substantially eliminating the effective temperature coefficient of a plurality of load-sensing strain gages $R_{LSn}$, relative to one unstressed strain gage $R_U$, over a predefined temperature range, F/T sensor accuracy is improved, and other thermal drift mitigation measures are rendered moot. The temperature compensation of strain gages according to embodiments of the present invention results in specific values of discrete trimming resistors, which are matched to the specific strain gages installed in an F/T sensor quarter-bridge measurement circuit. The compensation may be performed at F/T sensor manufacture, and once the trimming resistors are installed in the circuit, thermal drift is permanently eliminated, in hardware, for the life of the F/T sensor.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. As used herein, the term "configured to" means set up, organized, adapted, or arranged to operate in a particular way; the term is synonymous with "designed to." As used herein, the term "substantially" means nearly or essentially, but not necessarily completely; the term encompasses and accounts for mechanical or component value tolerances, measurement error, random variation, and similar sources of imprecision.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A temperature-compensated circuit for a Force/Torque sensor, comprising:
   a first plurality of first stages connected in parallel, each first stage configured to output a respective voltage at a node connecting a fixed resistor and a load-sensing strain gage in series between positive and negative power supply voltages;
   a second stage connected in parallel with the first stages, the second stage configured to output a voltage at a node connecting a fixed resistor and an unstressed strain gage in series between positive and negative power supply voltages;
   wherein the second stage voltage is subtracted from each first stage voltage; and
   an unstressed trimming resistor connected in parallel across the unstressed strain gage;
   wherein the value of the unstressed trimming resistor is selected so as to substantially eliminate an effective temperature coefficient, of the polarity opposite that of the power supply voltage connected to the fixed resistors, of all load-sensing strain gages, relative to the unstressed strain gage, over a predetermined temperature range.

2. The circuit of claim 1 further comprising:
   a second plurality of load trimming resistors, each connected in parallel across a load-sensing strain gage;
   wherein the value of each load trimming resistor is selected so as to substantially eliminate an effective temperature coefficient, of the polarity of the power supply voltage connected to the fixed resistors, of the associated load-sensing strain gage, relative to the unstressed strain gage, over the predetermined temperature range.

3. The circuit of claim 2, wherein the second plurality is one less than the first plurality, such that one load-sensing strain gage does not have a load trimming resistor connected across it.

4. The circuit of claim 3 wherein the load-sensing strain gage without a load trimming resistor is the load-sensing strain gage that exhibits a greatest effective temperature coefficient, of the polarity of the power supply voltage connected to the fixed resistors, relative to the unstressed strain gage, when no trimming resistor is connected across the unstressed strain gage.

5. The circuit of claim 1, wherein the unstressed strain gage is mounted to a member of the Force/Torque sensor that experiences substantially no mechanical strain as the Force/Torque sensor measures applied forces and/or torques.

6. The circuit of claim 1, wherein the load-sensing strain gages are mounted in pairs to a same side of a different deformable beam that experiences mechanical deformation from forces and/or torques measured by the Force/Torque sensor.

7. The circuit of claim 6, wherein the first plurality is six, and wherein three deformable beams have load-sensing strain gages mounted thereon.

8. A temperature-compensated circuit for a Force/Torque sensor, comprising:
   a first plurality of first stages connected in parallel, each first stage configured to output a respective voltage at a node connecting a fixed resistor and a load-sensing strain gage in series between positive and negative power supply voltages;
   a second stage connected in parallel with the first stages, the second stage configured to output a voltage at a node connecting a fixed resistor and an unstressed strain gage in series between positive and negative power supply voltages;
   wherein the second stage voltage is subtracted from each first stage voltage; and
   a second plurality of load trimming resistors, each connected in parallel across a load-sensing strain gage;
   wherein the value of each load trimming resistor is selected so as to substantially eliminate an effective temperature coefficient, of the polarity of the power supply voltage connected to the fixed resistors, of the associated load-sensing strain gage, relative to the unstressed strain gage, over the predetermined temperature range.

9. The circuit of claim 8 further comprising:
   an unstressed trimming resistor connected in parallel across the unstressed strain gage;
   wherein the value of the unstressed trimming resistor is selected so as to substantially eliminate an effective temperature coefficient, of the polarity opposite that of the power supply voltage connected to the fixed resistors, of all load-sensing strain gages, relative to the unstressed strain gage, over a predetermined temperature range.

10. The circuit of claim 9, wherein the second plurality is one less than the first plurality, such that one load-sensing strain gage does not have a load trimming resistor connected across it.

11. The circuit of claim 10 wherein the load-sensing strain gage without a load trimming resistor is the load-sensing strain gage that exhibited a greatest negative effective temperature coefficient, relative to the unstressed strain gage, prior to connecting the load trimming resistors.

12. The circuit of claim 8, wherein the unstressed strain gage is mounted to a member of the Force/Torque sensor that experiences substantially no mechanical strain as the Force/Torque sensor measures applied forces and/or torques.

13. The circuit of claim 8, wherein the load-sensing strain gages are mounted in pairs to a same side of a different deformable beam that experiences mechanical deformation from forces and/or torques measured by the Force/Torque sensor.

14. The circuit of claim 13, wherein the first plurality is six, and wherein three deformable beams have load-sensing strain gages mounted thereon.

15. A method of compensating a plurality of load-sensing strain gages in a Force/Torque sensor for thermal drift, in a circuit comprising a plurality of first stages connected in parallel, each first stage configured to output a respective voltage at a node connecting a fixed resistor and a load-sensing strain gage in series between positive and negative power supply voltages, and a second stage connected in parallel with the first stages, the second stage configured to output a voltage at a node connecting a fixed resistor and an unstressed strain gage in series between positive and negative power supply voltages, the method comprising:
measuring an output voltage of the second stage and each first stage, and subtracting the second stage output voltage from each first stage output voltage, over a predetermined temperature range;
in response to at least one load-sensing strain gage exhibiting an effective temperature coefficient, of a polarity opposite that of the power supply voltage connected to the fixed resistors, relative to the unstressed strain gage, adding an unstressed trimming resistor in parallel across the unstressed strain gage, wherein the value of the unstressed trimming resistor is selected so as to substantially eliminate the effective temperature coefficient, of the polarity opposite that of the power supply voltage connected to the fixed resistors, relative to the unstressed strain gage, of all load-sensing strain gages over the predetermined temperature range; and
for each load-sensing strain gage, in response to the load-sensing strain gage exhibiting an effective temperature coefficient, of a polarity of the power supply voltage connected to the fixed resistors, relative to the unstressed strain gage, adding a load-sensing trimming resistor in parallel across the load-sensing strain gage, wherein the value of the load-sensing trimming resistor is selected so as to substantially eliminate the effective temperature coefficient, of the polarity of the power supply voltage connected to the fixed resistors, relative to the unstressed strain gage, of the load-sensing strain gage over the predetermined temperature range.

16. The method of claim 15, wherein adding an unstressed trimming resistor comprises:
identifying a load-sensing strain gage exhibiting a greatest effective temperature coefficient, of the polarity opposite that of the power supply voltage connected to the fixed resistors, relative to the unstressed strain gage;
adding a first unstressed trimming resistor in parallel across the unstressed strain gage;
measuring responses of the identified load-sensing strain gage over the predetermined temperature range; and
iteratively, in response to the identified load-sensing strain gage exhibiting an effective temperature coefficient, of the polarity opposite that of the power supply voltage connected to the fixed resistors, relative to the unstressed strain gage, substituting a different unstressed trimming resistor for the current unstressed trimming resistor; and
measuring responses of the identified load-sensing strain gage over the predetermined temperature range;
until the identified load-sensing strain gage exhibits substantially zero effective temperature coefficient, relative to the unstressed strain gage, over the predetermined temperature range.

17. The method of claim 16, wherein iteratively measuring responses of the identified load-sensing strain gage over the predetermined temperature range comprises simulating a model of the circuit over the predetermined temperature range and recording simulated responses of the identified load-sensing strain gage.

18. The method of claim 15, wherein adding a load-sensing trimming resistor comprises, for each load-sensing strain gage identified as exhibiting an effective temperature coefficient, of the polarity of the power supply voltage connected to the fixed resistors, relative to the unstressed strain gage:
adding a first load-sensing trimming resistor in parallel across the load-sensing strain gage;
measuring responses of the load-sensing strain gage over the predetermined temperature range; and
iteratively, in response to the load-sensing strain gage exhibiting an effective temperature coefficient, of the polarity of the power supply voltage connected to the fixed resistors,
substituting a different load-sensing trimming resistor for the current load-sensing trimming resistor; and
measuring responses of the load-sensing strain gage over the predetermined temperature range;
until the load-sensing strain gage exhibits substantially zero effective temperature coefficient, relative to the unstressed strain gage, over the predetermined temperature range.

19. The method of claim 18, wherein iteratively measuring responses of the load-sensing strain gage over the predetermined temperature range comprises simulating a model of the circuit over the predetermined temperature range and recording simulated responses of the load-sensing strain gage.

20. The method of claim 15, wherein the unstressed strain gage is mounted to a member of the Force/Torque sensor that experiences substantially no mechanical strain as the Force/Torque sensor measures applied forces and/or torques.

21. The method of claim 15, wherein the Force/Torque sensor includes a six load-sensing strain gages, two of which are mounted to each of three deformable beams that experience mechanical deformation from applied forces and/or torques.

22. The method of claim 21, wherein the two load-sensing strain gages on each deformable beam are mounted on a same side of the deformable beam.

* * * * *